United States Patent [19]

Draggoo

[11] Patent Number: 4,641,315
[45] Date of Patent: Feb. 3, 1987

[54] MODIFIED INVOLUTE FLASHLAMP REFLECTOR

[75] Inventor: Vaughn G. Draggoo, Livermore, Calif.

[73] Assignee: The Boeing Company, Seattle, Wash.

[21] Appl. No.: 684,251

[22] Filed: Dec. 20, 1984

[51] Int. Cl.⁴ .............................................. H01S 3/093
[52] U.S. Cl. ....................................... 372/72; 372/99; 350/629
[58] Field of Search ........................ 372/69, 70, 72, 99, 372/98, 97, 66, 76, 53; 350/629, 630

[56] References Cited

U.S. PATENT DOCUMENTS 3,140,451  7/1964  Fox ......................................... 372/66
3,222,615 12/1965  Holly ...................................... 372/66

OTHER PUBLICATIONS

Siegrist; "Cusp Shape Reflectors to Pump Disk or Slab Lasers", Appl. Opt. vol. 15, No. 9; Sep. 1976.

Primary Examiner—Lëon Scott, Jr.
Attorney, Agent, or Firm—Finnegan, Henderson, Farabow, Garrett & Dunner

[57] ABSTRACT

A laser includes a reflector whose cross section in a plane perpendicular to the laser flashlamp axis defines a modified involute based on the marginal angle of the flashlamp.

4 Claims, 10 Drawing Figures

$\varepsilon_L = S(\varepsilon_D - \varepsilon_{Do})$ $\varepsilon_D = \eta_F \eta_U E_{CAP}/V$ $\eta_L = S\left(\eta_F \eta_U - \dfrac{\varepsilon_{Do}}{E_{CAP}/V}\right)$ DEFINITIONS:
$\varepsilon_D$ = ENERGY DEPOSITED
$\varepsilon_{Do}$ = THRESHOLD ENERGY
$\varepsilon_L$ = LASER OUTPUT
$\eta_U$ = LAMP UTILIZATION
$\eta_F$ = FLASHLAMP EFFICIENCY
$E_{CAP}$ = CAPACITOR L
$V$ = GAIN VOLUME

FIG. 10

MODIFIED INVOLUTE FLASHLAMP REFLECTOR

BACKGROUND OF THE INVENTION

This invention relates to the field of lasers and, more particularly, to reflectors for pulsed lasers.

Figure 1:
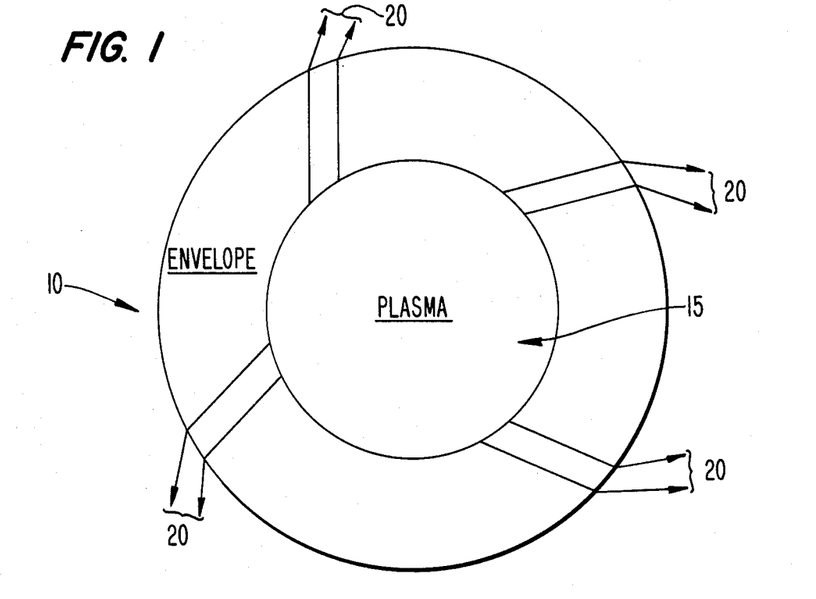
FIG. 1 is an axial view of a conventional linear flashlamp.

The objective of pulse lasers is to deliver energy from a flashlamp to a particular system. A linear, gas-filled, electric discharge flashlamp, e.g. flashlamp 10 in FIG. 1, emits light rays 20 uniformly around the flashlamp circumference. The radiating gas plasma 15 is optically thick, meaning that the light emanates from the surface of the plasma and not from within its bulk. In this way, the plasma approximates a black-body source. Flashlamps in practical use also require a coolant which is usually contained in a jacket surrounding the flashlamp.

Flashlamps are used as optical "pumps" for many types of lasers. Examples include solid state lasers, such as $Nd^{2+}$+YAG and $Nd^{2+}$+ glass, liquid lasers, such as organic dye lasers, and gas lasers, such as pulsed chemical lasers. Generally speaking, the efficiency of the laser device depends upon the collection efficiency of the reflector used to couple the flashlamp light to the laser material in the gain volume. Gain volume is the volume of space occupied by the laser material from which the laser light emanates.

Reflectors are used in flashlamp-pumped pulsed lasers to direct the uniformly distributed flashlamp rays toward the laser materials in the gain volume. The optimal reflector surface should direct all the flashlamp rays to the laser materials through a minimum aperture. The reflector surface should not allow those rays to reenter the flashlamp plasma.

Figure 2:
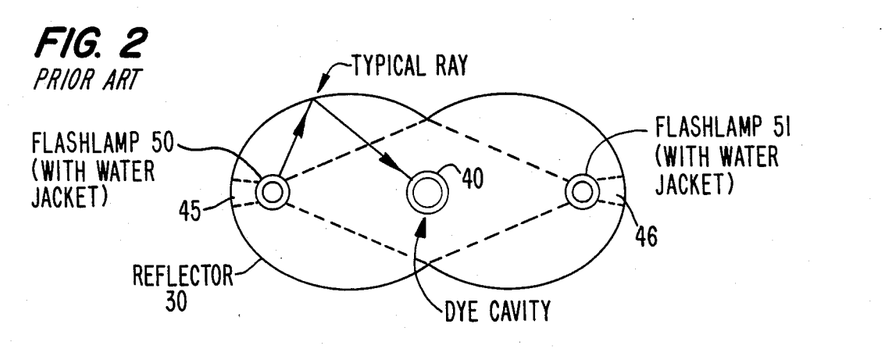
FIG. 2 shows a prior art double ellipse imaging reflector.

Two commonly-used reflectors are imaging reflectors and diffuse reflectors. An example of an imaging reflector is the double ellipse reflector 30 shown in FIG. 2. Imaging reflector 30, however, has several disadvantages. Light which enters regions 40 and 45 is not imaged at the correct location, and thus is not used efficiently. Instead, that light is dispersed throughout the reflector cavity (region 40) or is reflected back into flashlamps 50 and 51 (regions 45 and 46, respectively) and reabsorbed. Reabsorbed light is not used efficiently since it does not merely "repump" the flashlamp. There is a large fraction of such light in the ultraviolet region which is absorbed by the lamp wall and lost.

Figure 3:
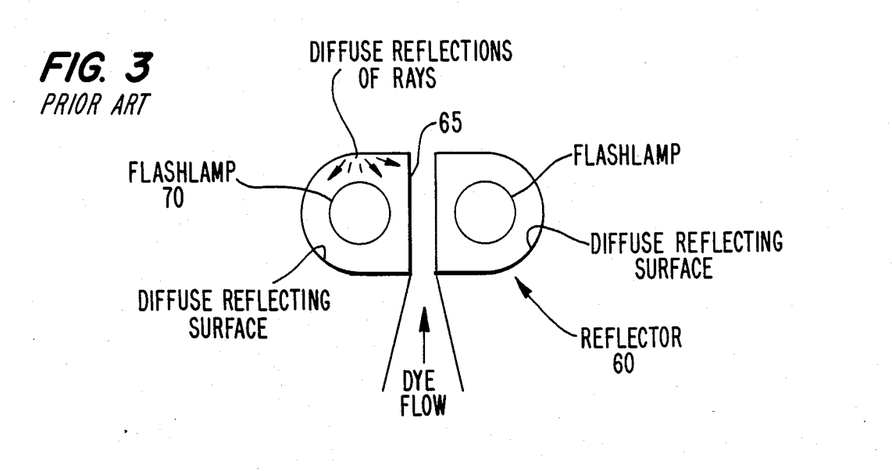
FIG. 3 shows a prior art diffuse reflector.

An example of a diffuse reflector 60 is shown in FIG. 3. Reflector 60 relies on multiple reflections from a diffuse surface to allow light to emerge from aperture 65. Reflector 60 is also quite lossy due both to the less than 100% reflection and the reabsorption of light by flashlamp 70.

The problems with reflector design often prevent certain lasers from having practical application. Flashlamp pumped dye lasers, in the past, have not been considered viable for many applications because of poor laser efficiency and short flashlamp lifetime. Power requirements, system and subsystem performance and, therefore lifetime, depend directly on laser efficiency. Increased laser efficiency relaxes the power and energy requirements on a flashlamp and increases the life of the lamp. In flashlamp pumped dye lasers, the laser efficiency varies directly with the fraction of light emitted by the lamp and deposited in the gain volume, and varies inversely with gain volume.

Figure 4:
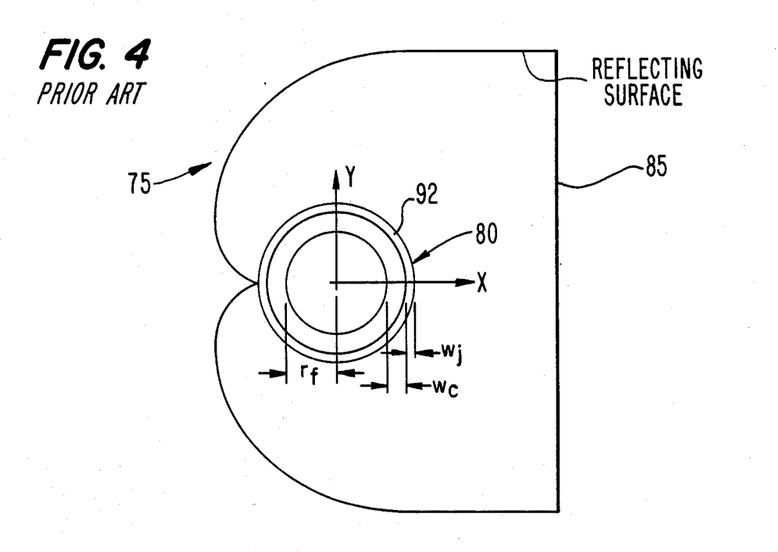
FIG. 4 shows a prior art simple involute cusp reflector.

One attempt to improve flashlamp reflector design is explained in M. R. Siegrist, "Cusp shaped reflectors to pump disk or slab lasers," Applied Optics 2167, Vol. 15, No. 9 (September 1976). The reflector surface proposed in that article has a cross-section which is a curve defined as a simple involute, as shown in FIG. 4. In a rectangular coordinate system with the center of flashlamp 80 being the origin, reflector 75 has a curved reflector surface whose cross-section defines a curve:

$$x = \pm(r\cos\theta + r\theta\sin\theta),$$

and $$(0 \leq \theta \leq \pi)$$

$$y = r\sin\theta - r\theta\cos\theta,$$

where
  $\theta$ is an angular parameter, and
  r is the radius of the entire flashlamp and surrounding cooling jacket.

This simple involute reflector does not possess a high efficiency, since it does not account for the angles at which light rays leave an actual flashlamp. In addition, the ideal involute reflector has a very wide aperture 85 equal to $2\pi r$. [definition for reflector aperture] reflector aperture is the opening from which light emanates from the reflector/lamp assembly.

In the flashlamp shown in FIG. 4, $r = r_f + (w_j + w_c)$, where $r_f$ is the diameter of the flashlamp 80, $w_j$ is the width of the cooling jacket 92 and $w_c$ is the width of the coolant contained by the jacket 92. The coolant is necessary to prevent the flashlamp from overheating. A typical value for $r_f$ is 3 mm, a typical value for $w_j$ is 1 mm and a typical value for $w_c$ is 2 mm. Thus, r is typically about 6 mm, so a conventional simple involute reflector 75 typically has a span of about 37.7 mm.

For efficiency, flashlamp reflector designs should maximize the pumping density (joules per unit volume). The wide aperture of the simple involute reflector reduces that density since it increases the gain volume. A flashlamp reflector should also maximize efficiency and pulse energy simultaneously. Other conventional reflectors that add favorable efficiency are scalable to larger pulse energies only through extending the gain length.

One objective of this invention is to improve reflectors for flashlamp lasers such that the reflectors direct the flashlamp energy through a minimum aperture and away from the flashlamp.

Another objective is to provide an optimal reflector surface configuration which can easily be determined for any flashlamp laser.

SUMMARY OF THE INVENTION

The present invention overcomes the problems of the prior art and achieves the objectives listed above by a laser reflector having a surface defining a modified involute shape, and by surrounding the laser flashlamp with a coolant material in the region bounded by the reflector surface and a laser window.

To achieve the objectives, and in accordance with the purposes of this invention, as embodied and broadly described herein, the reflector of this invention for a laser having a substantially cylindrical flashlamp whose marginal angle, $\phi_m$, is less than $\pi/2$, comprises a surface of light-reflective material which has a cross-section in a plane perpendicular to the flashlamp axis defined by $$x = \pm(r\cos\theta + r\theta\sin\phi_m(\cos\phi_m\cos\theta + \sin\phi_m\sin\theta)),$$

and $$y = r\sin\theta + r\theta\sin\phi_m(\cos\phi_m\sin\theta - \sin\phi_m\cos\theta),$$

where x and y are orthogonal axes of a Cartesian coordinate system, which axes intersect at the flashlamp axis, where $\theta$ represents an angular parameter and $0 \leq \theta < \pi$, and where r is the radius of the cylindrical flashlamp.

The accompanying drawings, which are incorporated in and which constitute a part of this specification, illustrate various embodiments of the invention and, together with the description, explain the principles of the invention.

DESCRIPTION OF THE PREFERRED EMBODIMENT

Reference will now be made in detail to presently preferred embodiments of the invention, examples of which are illustrated in the accompanying drawings.

A flashlamp and reflector system should ideally gather all the light emitted by the lamp and deposit it into a small gain volume. This results in favorable laser output characteristics. Certain constraints, including absorption of the light reentering the lamp, are imposed by the lamp physics. Specifically, the lamp plasma is optically thick, and the enery absorbed is dispersed throughout the emitted spectrum. This has important consequences for reflector design.

The angles of the light rays leaving a flashlamp are a function of the width of the lamp envelope the refractive indices of the lamp envelope and the media surrounding the envelope. The correct reflector surface must account for the refraction of the light emanating from the flashlamp plasma as that light passes through the lamp envelope and into the media between the lamp and the reflector.

Figure 5:
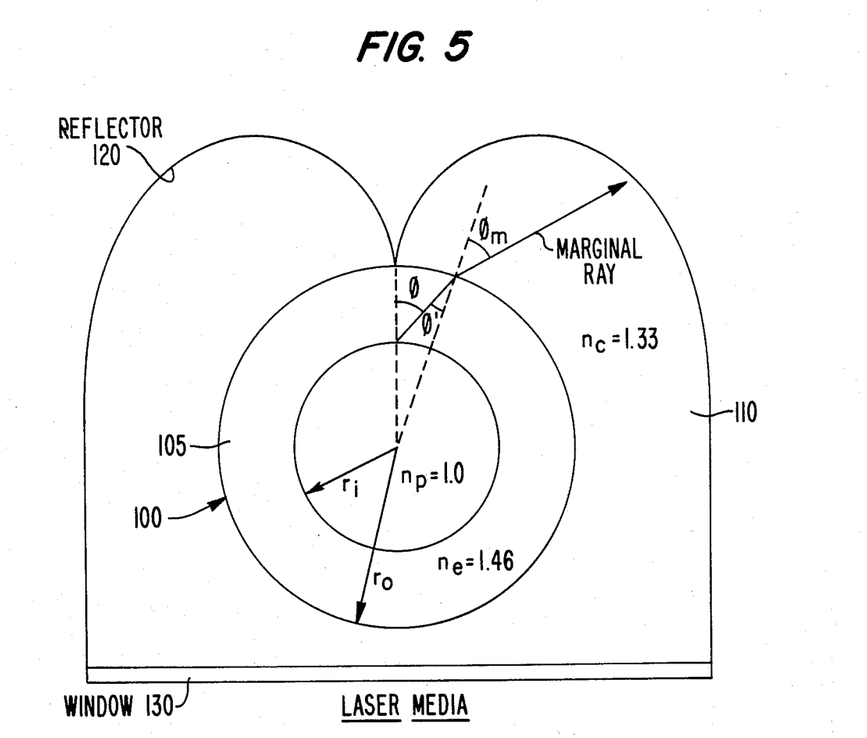
FIG. 5 depicts the relevant parameters of a laser system which are used for calculation of marginal ray angle $\phi_m$.

The term, marginal angle, $\phi_m$, is typically defined to be the maximum refraction angle. All light rays leaving a flashlamp have an angle less than $\phi_m$. FIG. 5 shows the relationship of $\phi_m$ to the flashlamp 100, envelope 105 and surrounding media 110.

The reflector of this invention ensures that the marginal light rays, which are the light rays at the marginal angle, $\phi_m$, encounter the reflector at normal incidence, and that any light ray having an angle less than $\phi_m$ encounters the reflector at less than normal incidence. Thus, light rays at angles less than $\phi_m$ are reflected away from the flashlamp by the reflector.

The general expression for such a reflector surface for a flashlamp with no coolant jacket is a "modified involute," surface shape of which is defined in a plane perpendicular to the flashlamp axis by the following equation:

$$x = \pm(r\cos\theta + r\theta\sin\phi_m(\cos\phi_m\cos\theta + \sin\phi\sin\theta)),$$

and $$y = r\sin\theta + r\theta\sin\phi_m(\cos\phi_m\sin\theta - \sin\phi_m\cos\theta),$$

where r is the radius of the flashlamp envelope, $\theta$ is an angular parameter varying between zero and pi radius, and x and y are orthogonal axes in a Cartesian coordinate system that intersect at the flashlamp axis.

The simple involute reflector described in the previously mentioned paper by Siergrist (See FIG. 4) is only proper for a lamp having an envelope with no thickness and where the media between the flashlamp and reflector has a refractive index of 1.0. In such a case $\phi_m = \pi/2$ and the above-mentioned equations for the modified involute devolve into:

$$x = \pm(r\cos\theta + r\theta\sin\theta),$$

and $$y = r\sin\theta - r\theta\cos\theta,$$

where x, y, r, and $\theta$ are as described above.

In actual lasers, of course, the flashlamp envelope has a finite, non-zero width and is formed of material whose refractive index is greater than 1.0. Thus the simple involute reflector is not optimal for actual lasers. The immediately preceeding above equation for a simple involute also assumes no coolant or coolant jacket for the flashlamp with a simple involute reflector, which is also not practical.

Coolant for actual flashlamps is needed, but such coolant need not be confined in a jacket around the flashlamp. Instead, the coolant can occupy substantially the entire region between the flashlamp and the reflector. Elimination of the requirement for a coolant in a jacket reduces the effective diameter of the flashlamp and also minimizes the aperture width of lasers using the modified involute reflector of this invention. In the flashlamp shown in FIG. 4, this would reduce the effective diameter of the flashlamp by 50% and thereby reduce the aperture.

The reflector depicted in FIG. 5 illustrates one embodiment of the reflector system of this invention in which liquid coolant 10 surrounds the flashlamp 100, occupying substantially the entire region between the flashlamp and the reflector. The coolant, which is contained in the space bounded by modified involute reflector surface 120 and transparent window 130, typically comprises water having a refractive index of 1.33. A 5 mm×7 mm (I.D.×O.D.) lamp with water between the lamp and reflector has a marginal angle of about 0.56 radius.

Figure 6:
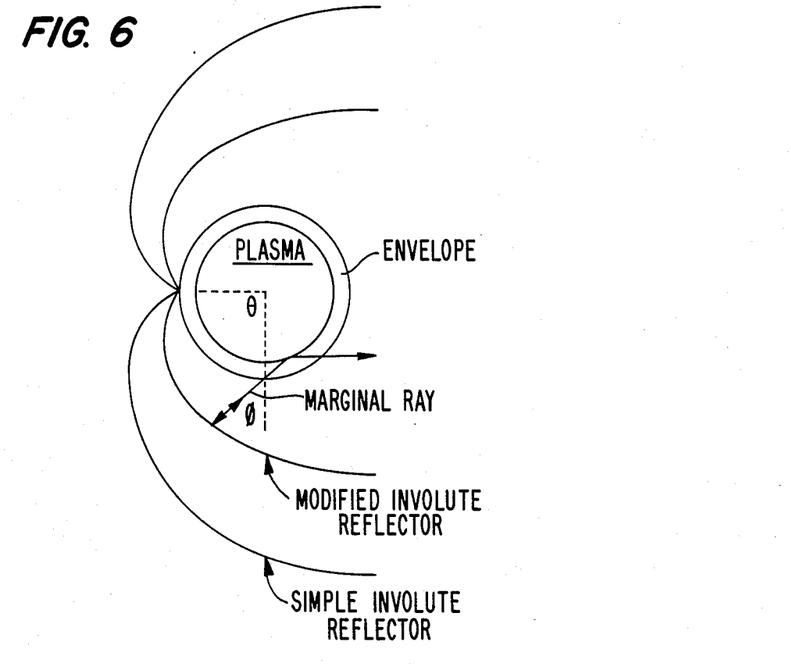
FIG. 6 demonstrates a comparison of the cross-sections of the prior art simple involute cusp reflector of FIG. 4 and a modified involute reflector of this invention for equivalent flashlamps.

The cross-section of a reflector in a plane perpendicular to the flashlamp axis is shown in FIG. 6 for a laser according to this invention having a marginal angle of 0.56 radius. This cross-section is superimposed on a similarly referenced cross-section of a simple involute reflector for the same sized flashlamp. The resulting exit aperture of the modified involute reflector of this invention is 1.6 times smaller than the simple involute reflector for the same flashlamp. This means that the radiance from a modified involute reflector according to the present invention is 1.6 times greater than a comparable laser with the simple involute reflector.

The actual improvement of the modified involute reflector over the simple involute reflector is even more stark. The curve in FIG. 6 for the simple involute assumes no coolant jacket. As indicated, the jacket and coolant can double the effective radius of the flashlamp, thus doubling the size of the aperture of the simple involute reflector with such a flashlamp. The exit aperture of the modified involute reflector of this invention, where no coolant jacket is required, is thus more than three times smaller than that of a laser with a simple involute reflector whose flashlamp is surrounded by coolant in a coolant jacket.

The marginal angle $\phi_m$ for a laser of this invention including a flashlamp surrounded by a coolant can be calculated from the refractive index in the flashlamp plasma, $n_p$, the refractive index of the envelope, $n_e$, and the refractive index of the coolant, $n_c$. As shown in FIG. 5, the grazing incidence ray of a luminous plasma is typically refracted into the envelope at an angle $\phi = \sin^{-1}(n_p/n_e)$. The grazing incidence ray is the light ray entering the envelope. This ray intercepts the outer lamp wall at an angle $\phi'$, which is equal to $$\sin^{-1}(n_p/n_e) - \tan^{-1}[m + 2r_i(m^2+1)/(-2mr_i+Z)],$$

where $$Z = (4m^2 r_i^2 - 4(m^2+1)(r_o^2 - r_i^2))^{\frac{1}{2}},$$

and $$m = \tan(\pi/2 - \sin^{-1}(n_p/n_e)).$$

The marginal ray angle, $\phi_m$, is equal to $$\sin^{-1}(n_e/n_c \sin \phi').$$

Table I, below, shows the resulting marginal angles for different coolant indices of refraction and flashlamp sizes:

TABLE I

| $n_c$ | $r_i$ (mm) | $r_o$ (mm) | $\phi_m$ (radian) |
|---|---|---|---|
| 1.0 | 6.9 | 7.0 | 1.4 |
| 1.0 | 6.0 | 7.0 | 1.03 |
| 1.0 | 5.0 | 7.0 | 0.785 |
| 1.33 | 5.0 | 7.0 | 0.567 |
| 1.33 | 6.0 | 7.0 | 0.70 |
| 1.33 | 5.0 | 6.0 | 0.677 |

All of these assume that the plasma has a refractive index, $n_p$, equal to 1.0, and is jacketed by a cylindrical quartz envelope whose refractive index, $n_e$, is equal to 1.46.

As Table I shows, coolants with large indices of refraction yield low marginal angles. The lower the marginal angle, the smaller the exit aperture of the reflector with a modified involute reflector of this invention.

Figure 7:
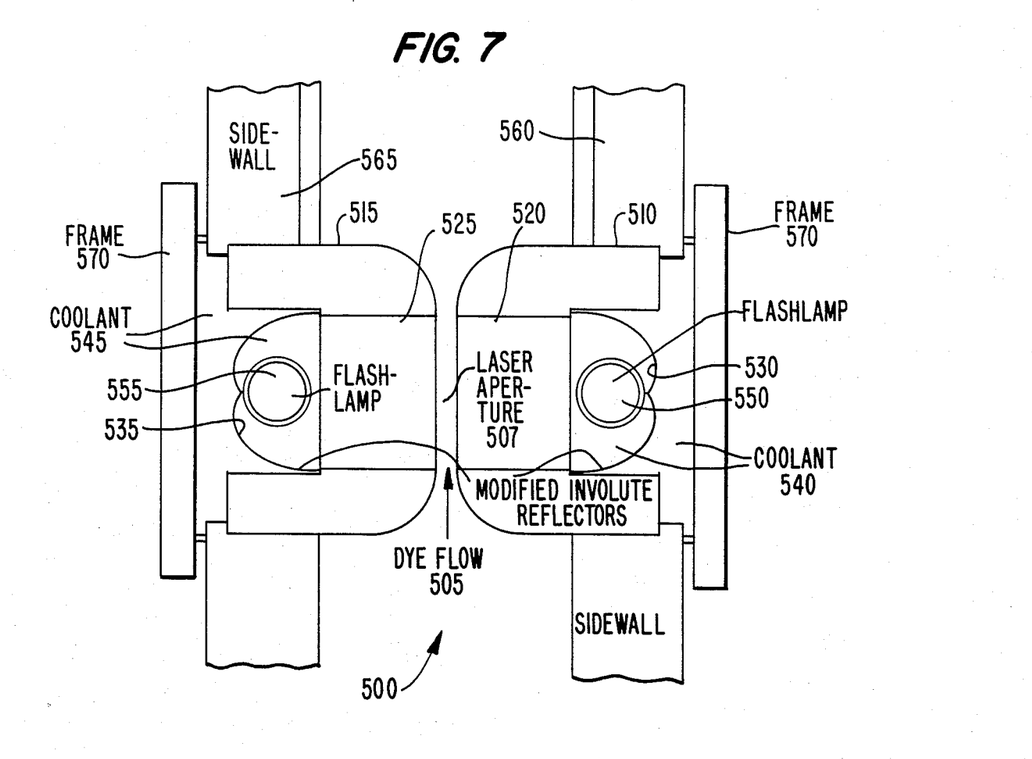
FIG. 7 is a cross-sectional view of a double involute dye laser of this invention.

FIG. 7 shows a cross section of another embodiment of this invention suitable for use in dye laser 500. This embodiment is called a double involute dye laser. The dye solution 505 flows vertically through laser aperture 507 between two opposed laser assemblies 510 and 515. Only assembly 510 will be discussed, with the understanding that assembly 515 has equivalent components.

Assembly 510 includes a transparent glass window 520 and a modified involute reflector 530, as described previously. Together, window 520 and reflector 530 form a container for flashlamp coolant 540 which surrounds flashlamp 550 and, in recirculating, flows parallel to the lamp axis of flashlamp 550. That axis is perpendicular to the cross-section in FIG. 7. Window 520 not only provides a boundary for coolant 540, but also directs the flow of dye 505 in the appropriate relationship with flashlamp 550 and reflector 530. Coolant 540 is also outside reflector 530 to equalize pressure on both sides of the reflector.

Elements 525, 535, 545 and 555 in assembly 515 correspond respectively with elements 520, 530, 540 and 550 in assembly 510. Windows 520 and 525 form a light conduit which transmits light from the flashlamps and modified involute reflectors to the flowing dye sheet. As described above, the reflectors focus energy from flashlamp 550 and 555 onto the dye sheet and conduct waste flashlamp light not absorbed by the dye solution away from the flashlamp.

To complete the description of FIG. 7, the assemblies 510 and 515 are mounted in sidewalls 560 and 565, respectively, which are themselves mounted in a frame 570 that allows precise positioning of windows 520 and 525 with respect to each other. Such a mounting facilitates adjustment of the spacing between the windows.

The modified-involute reflector shown in FIG. 7 is fabricated on a precisely machined and polished mandrel by electro-deposition of nickel. Complicated reflecting surfaces such as reflectors 530 and 535 are routinely manufactured in this manner.

The faces of the windows 520 and 525 are ground smooth and polished. For ease of fabrication and reduction of cost, the laser frame and sidewalls are made of PVC plastic.

Figure 8:
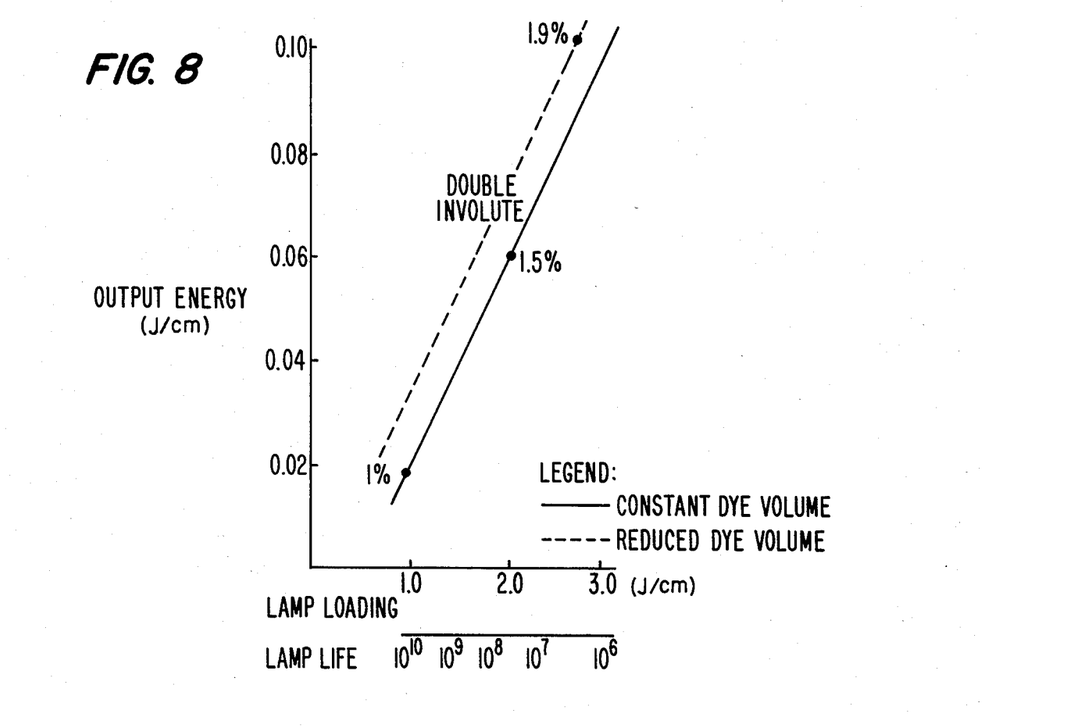
FIG. 8 is a graph of the performance of the laser in FIG. 7.

FIG. 8 illustrates the performance projections for the double involute dye laser shown in FIG. 7. This analysis reveals that an efficiency of 1% to 2% can be realized with the laser system and reflector of this invention. The performance illustrated in FIG. 8 considerably relaxes the lamp loading, and therefore extends lamp life.

Improved laser output and efficiency can be obtained by increasing the pumping rate of the active medium. In flashlamp pumped dye lasers, this can be accomplished through increased flashlamp utilization, increased lamp loading, and decreased gain volume (but not at the expense of lamp utilization). To improve efficiency, several factors must be balanced.

Figure 9:
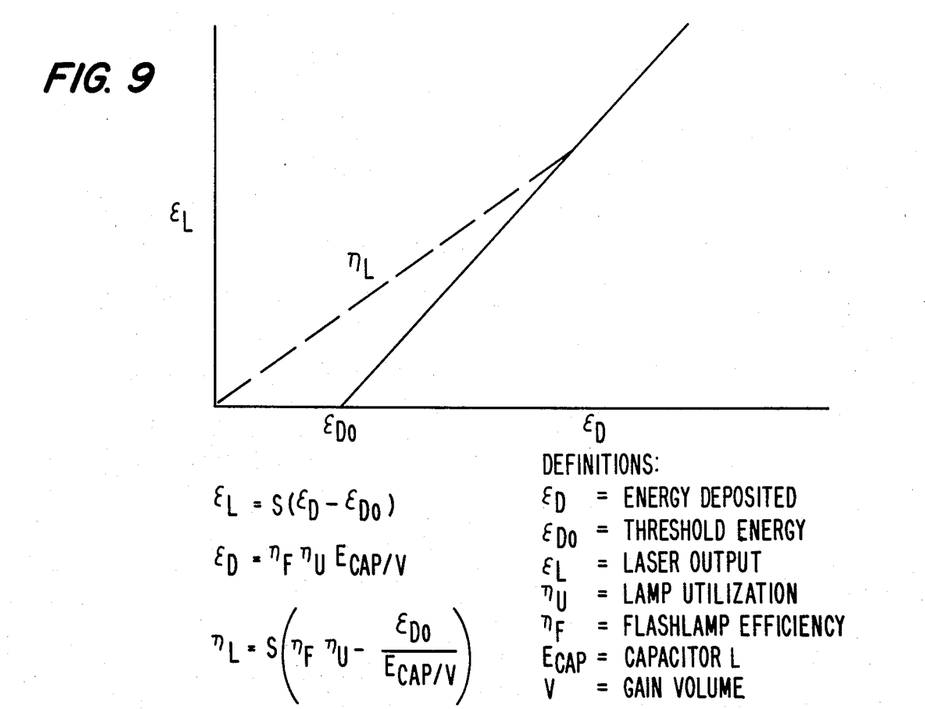
FIG. 9 is a graph of performance relationships for the laser in FIG. 7.

Since the planar geometry of the illumination from the involute reflector imposes a rectangular gain volume, the volumetric pumping can be increased by increasing the dye concentration and reducing the width. In principle, there is no limit to the pumping rate achievable. In practice, however, there are two optical loss mechanisms that degrade laser performance as pumping rate is increased: refractive index and gain gradients parallel to the excitation direction due to absorption; and refraction losses due to the reduced Fresnel number of the narrow width. The design of the laser of this invention must account for these two mechanisms to maintain efficient optical extraction from the gain medium. FIG. 9 shows the functional dependence of laser output on reflector efficiency, n, and gain volume, V.

Figure 10:
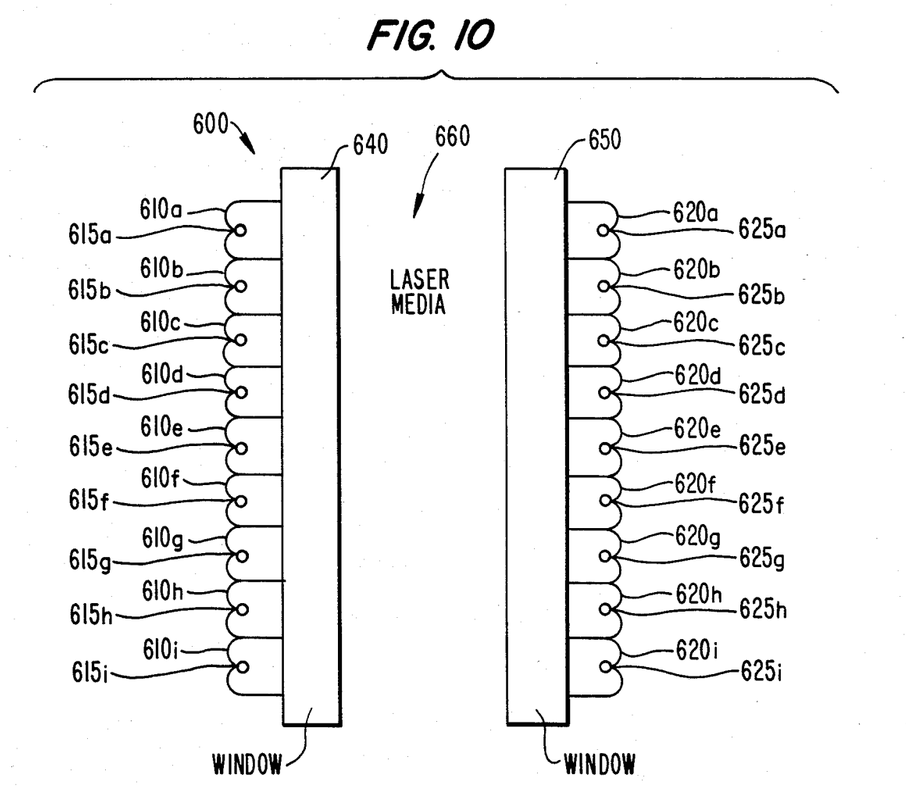
FIG. 10 shows another modified involute assembly of this invention.

The modified involute reflector of this invention can also be ganged as shown in FIG. 10. In laser 600 shown in FIG. 10, modified involute reflectors 610$_a$–610$_i$, each with a corresponding flashlamp 615$_a$–615$_i$, are shown connected to window 640 on one side. Modified involute reflectors 602$_a$–620$_i$, each with a corresponding flashlamp 625$_a$–625$_i$, are shown connected to window 650 on the other side. Laser media 660 separates windows 640 and 650 and can be gas or liquid. Each facing pair of reflectors, e.g., 610$_a$ and 620$_a$, is constructed like and operates the same as the double involute laser in FIG. 7. Laser 600 is not limited to the nine pairs of reflectors shown in FIG. 10, but can have up to twenty or more such pairs. The arrangement in FIG. 10 can be used for pulsed chemical lasers and dye laser applications.

It will be apparent to those skilled in the art that modifications and variations can be made in the modified involute reflector of this invention. The invention in its broader aspects is not limited to the specific details, representative methods and apparatus, and illustrative examples shown and described. Departure can be made from such details without departing from the spirit or scope of the general inventive concept of the modified involute reflector.

What is claimed is:

1. A reflector for a laser having a substantially cylindrical flashlamp whose marginal angle, $\phi_m$, is less than 90°, said laser reflector comprising a surface of light-reflective material and a cross-section, in a plane perpendicular to the axis of said cylindrical lamp, defined by $$x = \pm(r\cos\theta + r\theta\sin\phi_m(\cos\phi_m\cos\theta - \sin\phi_m\sin\theta)),$$

and $$y = r\sin\theta + r\theta\sin\phi_m(\cos\phi_m\sin\theta - \sin\phi_m\cos\theta),$$

where x and y are orthogonal axes of a Cartesian coordinate system which axes intersect at the axis of said flashlamp, where $\theta$ represents a varying angle of rotation around said flashlamp axis such that $0 \leq \theta < \pi$, and where r is the radius of said cylindrical flashlamp.

2. A laser including:
at least one substantially cylindrical flashlamp including a gas discharge region surrounded by a light-transparent envelope;
a coolant material surrounding said flashlamp;
a light-transparent laser window in contact with part of said coolant material; and
a flashlamp reflector connected to said laser window in fluid-tight relationship, said reflector having a light-reflective surface in contact with said coolant material, said coolant filling substantially the entire volume surrounding said flashlamp and enclosed by said reflector and said window, and said reflector having a reflective surface whose cross section in a plane perpendicular to said flashlamp axis is defined by $$x = \pm(r_o\cos\theta + r_o\theta\sin\phi_m(\cos\phi_m\cos\theta - \sin\phi_m\sin\theta)),$$

$$y = r_o\sin\theta + r_o\theta\sin\phi_m(\cos\phi_m\sin\theta - \sin\phi_m\cos\theta),$$

where x and y represent orthogonal axes in a Cartesian coordinate system which axes intersect at said flashlamp axis, where $\theta$ represents a varying angle of rotation around said flashlamp axis between zero and pi radius where $r_o$ is the outer diameter of said transparent flashlamp envelope, and where $\phi_m$ is a marginal angle defined by the equation $$\phi_m = \sin^{-1}(n_e/n_c \sin\phi'),$$

where $n_e$ is refractive index of said flash lamp envelope,
$n_c$ is refractive index of said coolant material, and
$\theta'$ is defined by the equation $$\phi' = \sin^{-1}(n_p/n_e) - \tan^{-1}\left(m + \left\{\frac{[2r_i(m^2 + 1)]}{(-2mr_i + Z)}, \right\}\right)$$

where $n_p$ is the refractive index of said gas discharge region,
$r_i$ is the inside diameter of said flashlamp envelope, $$m = \tan(\pi/2 - \sin^{-1}(n_p/n_e)), \text{ and}$$

$$Z = (4m^2 r_i^2 - 4(m^2 + 1)(r_o^2 - r_i^2))^{\frac{1}{2}}$$

$$\phi' = \sin^{-1}(n_p/n_e) - \tan^{-1}\left(m + \left(\frac{2r_i(m^2 + 1)}{-2mr_i + Z}\right)\right)$$

3. A laser including:
two parallel flashlamps having circular cross sections, each including a gas discharge region surrounded by a transparent envelope, the flashlamps having a marginal angle, $\phi_m$, less than $\pi/2$ radius;
a coolant material surrounding each of said flashlamps;
two laser windows, each said laser window contacting the coolant material surrounding a different one of said flashlamps; and
two flashlamp reflectors each connected to a different one of said laser windows in fluid-tight relationship to bound said coolant material around a different one of said flashlamps, said coolant material filling substantially the entire volume surrounding each said flashlamp, each said reflector having a reflective surface whose cross section in a plane perpendicular to said flashlamps' axes is defined by the equation $$x = \pm(r\cos\theta + r\theta\sin\phi_m(\cos\phi_m\cos\theta + \sin\phi_m\sin\theta)),$$

and $$y = r\sin\theta + r\theta\sin\phi_m(\cos\phi_m\sin\theta - \sin\phi_m\cos\theta),$$

where
- x and y are orthogonal axes of a Cartesian coordinate system which intersect at the center of said circular cross section of its corresponding flashlamp,
- r is the radius of said corresponding flashlamp, and
- $\theta$ is a varying angle of rotation around said flashlamp axis between zero and pi radius.

4. A laser including:
(a) a plurality of serially-arranged laser sections each including
   two parallel flashlamps having circular cross sections, each including a gas discharge region surrounded by a transparent envelope, the flashlamps having a marginal angle, $\phi_m$, less than 90 degrees, and
   two flashlamp reflectors each surrounding a different flashlamp and each having a reflective surface whose cross section in a plane perpendicular to said flashlamps' axes is defined by the equation $$x = \pm(r\cos\theta + r\theta\sin\phi_m(\cos\phi_m\cos\theta + \sin\phi_m\sin\theta)),$$

and $$y = r\sin\theta + r\theta\sin\phi_m(\cos\phi_m\sin\theta - \sin\phi_m\cos\theta),$$

where
- x and y are orthogonal axes of a Cartesian coordinate system which intersect at the center of said circular cross sections of the flashlamp surrounded by said reflector,
- r is the radius of said surrounded flashlamp, and
- $\theta$ is a varying angle of rotation around said flashlamp axis between zero and pi radius;

(b) two parallel laser windows connected to each of said laser sections so as to form a fluid-tight compartment with each reflector in each laser section, each fluid-tight compartment containing one of said flashlamps; and (c) coolant material surrounding said flashlamps in each of said compartments.

* * * * *